(12) United States Patent
Hammer et al.

(10) Patent No.: US 8,495,264 B1
(45) Date of Patent: Jul. 23, 2013

(54) ALIGNMENT CIRCUIT FOR PARALLEL DATA STREAMS

(75) Inventors: Michael Hammer, Westchester, IL (US); Jin Zhang, Lake Zurich, IL (US)

(73) Assignee: Lattice Semiconductor Corporation, Hillsboro, OR (US)

(*) Notice: Subject to any disclaimer, the term of this patent is extended or adjusted under 35 U.S.C. 154(b) by 276 days.

(21) Appl. No.: 13/178,536

(22) Filed: Jul. 8, 2011

(51) Int. Cl.
*G06F 13/12* (2006.01)
*H04L 7/00* (2006.01)

(52) U.S. Cl.
USPC ............................................ 710/71; 375/354

(58) Field of Classification Search
USPC .............................. 710/71; 713/400; 375/354
See application file for complete search history.

(56) References Cited

U.S. PATENT DOCUMENTS

| | | | |
|---|---|---|---|
| 5,710,774 A * | 1/1998 | Suh et al. ....................... | 370/513 |
| 6,578,153 B1 * | 6/2003 | Sankey et al. .................. | 713/400 |
| 7,002,368 B2 | 2/2006 | Lee et al. | |
| 7,046,174 B1 | 5/2006 | Lui et al. | |
| 7,292,662 B2 * | 11/2007 | Gregorius ...................... | 375/350 |
| 2004/0202261 A1 * | 10/2004 | Gregorius ...................... | 375/354 |
| 2006/0050827 A1 * | 3/2006 | Saeki et al. .................... | 375/362 |
| 2006/0256793 A1 | 11/2006 | Swartzentruber et al. | |
| 2007/0002965 A1 * | 1/2007 | Bauch et al. ................... | 375/295 |
| 2008/0247492 A1 * | 10/2008 | Sugimoto et al. .............. | 375/340 |

OTHER PUBLICATIONS

"RapidIO 2.x LP—Serial Physical Layer Endpoint Core—Product Brief," Praesum Communications, Jan. 2010, 1 pg.

* cited by examiner

*Primary Examiner* — Christopher Shin
(74) *Attorney, Agent, or Firm* — Mendelsohn, Drucker & Associates, P.C.

(57) ABSTRACT

Parallel data generated by demultiplexing received serial data such as in a Serial RapidIO (SRIO) data stream can become misaligned as a result of, e.g., clock tolerance compensation (CTC) processing at the receiver. In one embodiment of the invention, the misaligned parallel data is properly aligned based on a mapping from each of a finite number of possible previous alignment conditions (e.g., words A-D) to a corresponding finite number of possible subsequent alignment conditions (e.g., words B-G). The change from a previous alignment condition to a different subsequent alignment condition is recognized by determining the location of start-of-packet (SOP) or start-of-control-symbol (SOC) data in the parallel data stream.

12 Claims, 2 Drawing Sheets

TABLE I

| SCENARIO | PREVIOUS PROCESSING CYCLE | | | CURRENT PROCESSING CYCLE WHEN SOP/SOC MOVEMENT DUE TO CTC EVENT IS DETECTED | | | | SUBSEQUENT PROCESSING CYCLE | | |
|---|---|---|---|---|---|---|---|---|---|---|
| | PREVIOUS 4:1 MUX SELECT VALUE | PREVIOUS SOP/SOC POSITION | PREVIOUS DATA WORDS OUTPUT | NEW SOP/SOC POSITION | 4:1 MUX SELECT VALUE | DATA OVERWRITE OPERATION | DATA WORDS OUTPUT | 4:1 MUX SELECT VALUE | SOP/SOC POSITION | DATA WORDS OUTPUT |
| 1 | 0 | A OR C | A-D | B | 1 | NONE | B-E | 1 | B OR D | B-E |
| 2 | 0 | A OR C | A-D | D | 0 | OVERWRITE WORDS C & D WITH WORDS D & E | AB DE | 1 | D OR B | B-E |
| 3 | 1 | B OR D | B-E | C | 2 | NONE | C-F | 2 | C OR A | C-F |
| 4 | 1 | B OR D | B-E | E (A) | 1 | OVERWRITE WORD E WITH IDLE WORD | B-D, IDLE | 0 | A OR C | A-D |
| 5 | 2 | C OR A | C-F | D | 3 | NONE | D-G | 3 | D OR B | D-G |
| 6 | 2 | C OR A | C-F | F (B) | 2 | OVERWRITE WORD F WITH IDLE WORD | C-E, IDLE | 1 | B OR D | B-E |
| 7 | 3 | D OR B | D-G | E (A) | 2 | OVERWRITE WORD C WITH IDLE WORD | IDLE, D-F | 2 | A OR C | C-F |
| 8 | 3 | D OR B | D-G | G (C) | 3 | OVERWRITE WORD G WITH IDLE WORD | D-F, IDLE | 2 | C OR A | C-F |

ALIGNMENT CIRCUIT FOR PARALLEL DATA STREAMS

TECHNICAL FIELD

The present invention relates to electronic circuitry, and, more specifically but not exclusively, to circuitry for aligning data in parallel data streams, such as start of packet (SOP) and start of control symbols (SOC) data in parallel data streams generated by demultiplexing a received high-speed serial data stream, such as a Serial RapidIO (SRIO) data stream. The RapidIO specification is a packet-based technology defined for endpoints, which originate and process packets and switches, which are used to connect endpoints.

BACKGROUND

This section introduces aspects that may help facilitate a better understanding of the invention. Accordingly, the statements of this section are to be read in this light and are not to be understood as admissions about what is prior art or what is not prior art.

Serial high-speed data received by an SRIO endpoint contains both data packets and control symbols. This serial data is typically converted to parallel data by the SRIO receiver. In some applications, it is necessary to keep the start of packet (SOP) and start of control symbols (SOC) data aligned in the parallel data, where "alignment" means that the first bit of each instance of SOP or SOC data corresponds to the first bit of a parallel data word.

In one possible application, the parallel data consists of double 32-bit words (64 bits total), where clock tolerance compensation (CTC) processing can cause two 8-bit idle characters to be removed or inserted in the high-speed data stream. As known in the art, CTC processing compensates for a frequency differential that may exist between a local reference clock at the receiver and the data rate of the received serial data. This CTC processing can result in the SOPs and/or SOCs becoming misaligned by 16-bit increments with respect to the double-word boundary of the parallel data stream. In that case, circuitry is needed to correct for this misalignment resulting from CTC processing to ensure that the SOP/SOC data is properly aligned within the parallel data stream provided to downstream processing.

SUMMARY

In one embodiment of the invention, a receiver includes a serial-to-parallel (S-to-P) conversion circuitry and continuous alignment circuitry. The S-to-P conversion circuitry is configured to convert a serial input data stream having M-bit (e.g., 32-bit) serial-data words into an N-bit (e.g., 64-bit) parallel data stream. The continuous alignment circuitry is configured to correct for misalignment of the M-bit serial-data words within the N-bit parallel data stream to generate an N-bit aligned parallel output data stream. The continuous alignment circuitry is based on a mapping from each of a finite number of possible previous alignment conditions to a corresponding finite number of possible subsequent alignment conditions.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 2 shows Table I, which represents all of the possible scenarios for changes in the locations of SOP/SOC data resulting from CTC events from each possible previous location to each possible new location.

DETAILED DESCRIPTION

Figure 1:
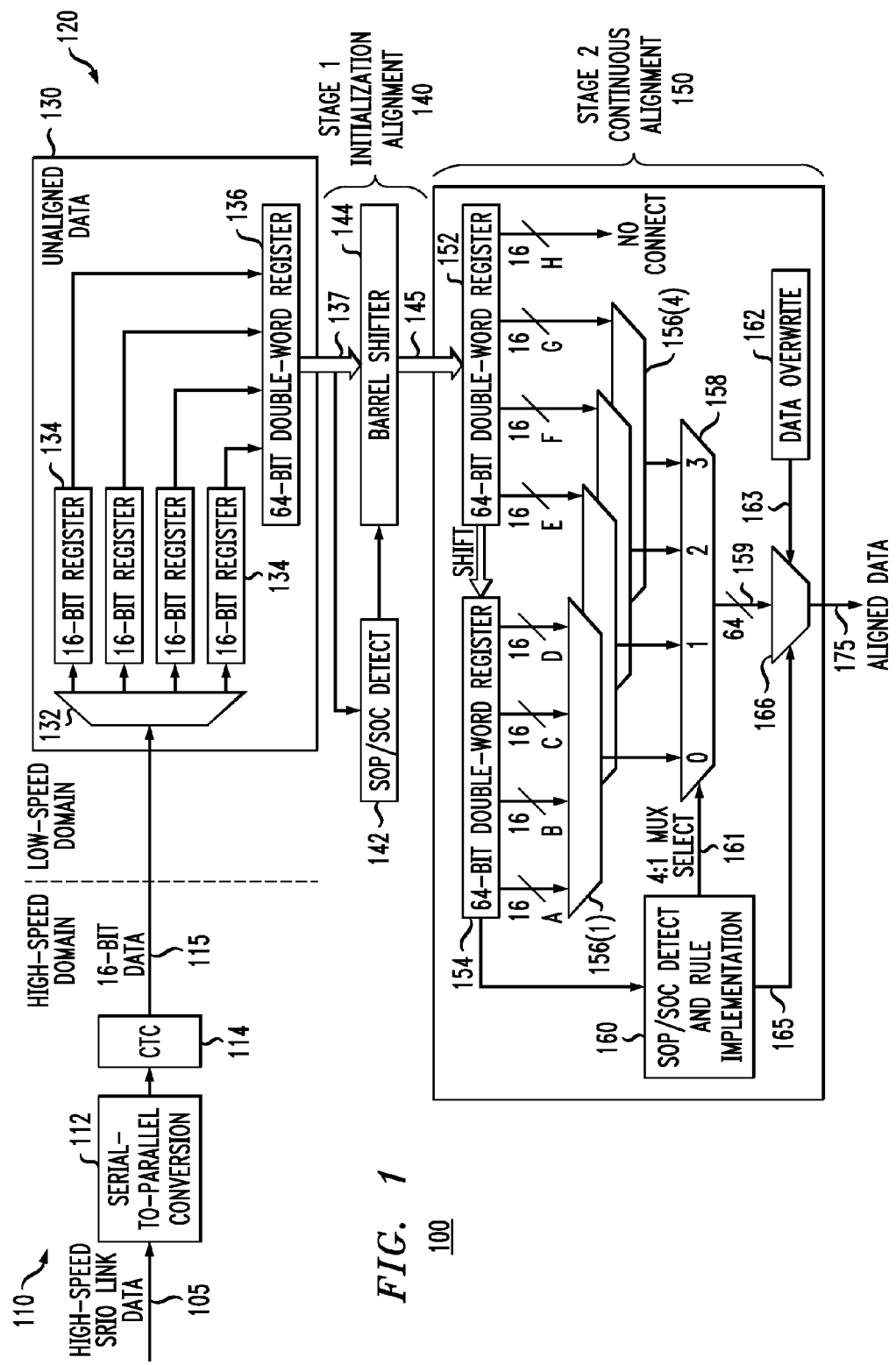
FIG. 1 shows a schematic block diagram of circuitry 100 that is part of an SRIO receiver, according to one embodiment of the present invention.

FIG. 1 shows a schematic block diagram of circuitry 100 that is part of an SRIO receiver, according to one embodiment of the present invention. As shown in FIG. 1, circuitry 100 receives a high-speed serial input data stream 105 from an SRIO link and outputs an aligned, 64-bit parallel output data stream 175 corresponding to the serial data stream. Circuitry 100 has two portions that operate at two different clock domains: (1) high-speed conversion circuitry 110 that converts serial input data stream 105 into a 16-bit parallel data stream 115 and (2) low-speed alignment circuitry 120 that converts 16-bit parallel data stream 115 into aligned, 64-bit parallel output data stream 175.

In particular, conversion circuitry 110 includes serial-to-parallel (S-to-P) converter 112, which converts serial input data stream 105 into a 16-bit parallel data stream, and clock tolerance compensation (CTC) processor 114, which applies CTC processing to the 16-bit parallel data stream to generate 16-bit parallel data stream 115. If CTC processor 114 detects a frequency differential of sufficient magnitude and depending on the sign of the detected frequency differential, then the CTC processor will either insert or remove a 16-bit Idle word (i.e., two 8-bit Idle characters) into or from the 16-bit parallel data stream received from S-to-P converter 112 to generate 16-bit parallel data stream 115.

In an SRIO serial data stream, a set of one or more 32-bit Idle words may exist between the end of a packet of data and the beginning of the next packet of data in the data stream. In addition, in order to ensure that Idle data will be available for potential removal by a CTC processor in a receiver to compensate for detected frequency differentials, the transmitter may purposely insert 32-bit Idle words into the SRIO serial data stream. In either case, the transmitter will always transmit either start-of-packet (SOP) or start-of-control-symbol (SOC) data immediately following each set of one or more 32-bit Idle words in the SRIO serial data stream. Note that CTC processor 114 will insert a 16-bit Idle word into the data stream only in locations where there are already one or more 32-bit SRIO Idle words in the data stream.

As known in the art, idle data refers to a sequence of special characters (aka "code-groups" after 8B/10B encoding) that is transmitted when a port is not initialized, or when a port is initialized and there is nothing else to transmit. In general, an SRIO idle sequence contains the /K/, /A/, and /R/ special code-groups. A 32-bit CTC Idle word is a particular sequence of SRIO idle data associated with clock tolerance compensation processing. In particular, a 32-bit CTC Idle word is a four-character sequence comprised of an 8-bit /K/ special character immediately followed by three 8-bit /R/ special characters (i.e., /K/,/R/,/R/,/R/). In an SRIO data stream, CTC Idle words may be transmitted alone or with other sequences of idle data.

In one implementation, when a CTC processor removes a 16-bit Idle word from a data stream, the CTC processor deletes the last two /R/ characters from a 32-bit CTC Idle word, leaving the 16-bit idle sequence (/K/, /R/) in the data stream. Similarly, when the CTC processor inserts a 16-bit Idle word into the data stream, the CTC processor appends two additional /R/ characters to the end of a 32-bit CTC Idle word, leaving the 48-bit idle sequence (/K/, /R/, /R/, /R/, /R/, /R/) in the data stream.

As suggested previously, without appropriate alignment circuitry, when converting 16-bit parallel data stream 115 into 64-bit parallel output data stream 175, the insertion or removal of 16-bit Idle words by CTC processor 114 would result in the start of packet (SOP) data and/or the start of control symbol (SOC) data disadvantageously becoming misaligned with respect to the two 32-bit boundaries of the resulting 64-bit double-word parallel data stream.

As shown in FIG. 1, alignment circuitry 120 includes 16-to-64-bit converter 130, initial alignment stage (Stage 1) 140, and continuous alignment stage (Stage 2) 150.

16-to-64-bit converter 130 converts 16-bit parallel data stream 115 received from conversion circuitry 110 into (possibly) unaligned, 64-bit parallel data stream 137. In particular, demultiplexer 132 sequentially stores consecutive 16-bit words from data stream 115 into different ones of four 16-bit registers 134. Each set of four 16-bit words stored in registers 134 is then output in parallel to 64-bit double-word register 136. Note that the term "double-word" refers to the fact that, in this embodiment, the SRIO data comprises 32-bit data words. Note further that the 64-bit data stored in double-word register 136 may be misaligned, for example, as a result of upstream CTC processing 114 inserting or removing a 16-bit Idle word. In this embodiment, misalignment refers to the situation where SOP or SOC data does not coincide with the beginning of either of the two 32-bit words stored in double-word register 136. Note that, in addition to being caused by CTC processing, misalignment may also exist at the beginning of receiver processing, such as after the receiver is initially powered on.

Initial alignment stage 140 is designed to correct for misalignment that exists at the beginning of receiver processing, and, in particular, before critical user data is transmitted to the receiver. In particular, SOP/SOC detector 142 analyzes the 64-bit data stored in double-word register 136 to determine whether there is any SOP and/or SOC data within those 64 bits of data. In general, at the beginning of receiver processing, SOP/SOC data may exist at any 8-bit byte within the 64 bits of data in register 136. After detecting SOP/SOC data at a particular byte within register 136, SOP/SOC detector 142 configures barrel shifter 144 to shift the 64 bits of data from double-word register 136 by an appropriate number of bytes (i.e., from 0 to 7) to align the SOP/SOC data with the 64-bit double-word boundary (i.e., the left-most or most-significant byte) in 64-bit parallel data stream 145 output from barrel shifter 144. (Note that, in theory, barrel shifter 144 could be configured to align the SOP/SOC data with either 32-bit word within 64-bit double-word data stream 145.) Once detector 142 detects SOP/SOC data and configures barrel shifter 144, detector 142 is disabled with the configuration of barrel shifter 144 fixed to the selected byte-shift value previously determined by detector 142. Note that the process of configuring barrel shifter 144 can result in the deletion or duplication of data, either of which would be unacceptable during subsequent processing of critical user data.

In the absence of CTC processing on subsequent received data in the data stream, the alignment established by initial alignment stage 140 would be maintained for any subsequent SOP/SOC data within 64-bit parallel data stream 145. With CTC processing of subsequent data, however, the insertion or removal of 16-bit Idle words will result in the misalignment of subsequent SOP/SOC data within 64-bit parallel data stream 145. Continuous alignment stage 150 is designed to compensate for this misalignment resulting from upstream CTC processing of this subsequent data.

In particular, continuous alignment stage 150 has two double-word registers 152 and 154, which store two consecutive 64-bit double-words from data stream 145. In particular, after the very first 64-bit double-word is stored in register 152, all 64 bits are shifted into register 154, and the next 64-bit double-word from data stream 145 is stored in register 152. After those two 64-bit double-words are processed during one processing cycle (as described below), the 64 bits from register 152 are again shifted into register 154, and the next 64-bit double-word from data stream 145 is stored in register 152 for the next processing cycle. In this way, with the exception of the very first and very last 64-bit double-words, each 64-bit double-word from data stream 145 is processed twice in consecutive processing cycles within continuous alignment stage 150: first when it is stored in register 152 and then again when it is stored in register 154.

As represented in FIG. 1, the 64 bits of data stored in register 154 may be said to correspond to four 16-bit words labeled A, B, C, and D, where A corresponds to the left-most (i.e., most-significant) 16-bit word in register 154, and D corresponds to the right-most (i.e., least-significant) 16-bit word in register 154. Similarly, the 64 bits of data stored in register 152 may be said to correspond to four 16-bit words labeled E, F, G, and H, where E corresponds to the left-most 16-bit word in register 152, and H corresponds to the right-most 16-bit word in register 152. Note that, in the absence of any misalignment resulting from CTC processing, 32-bit SRIO words in the data stream will be aligned with the 16-bit words A, C, E, and G in registers 152 and 154. A CTC event would result in the 32-bit SRIO words being misaligned with the 16-bit words B, D, F, and H.

As shown in FIG. 1, continuous alignment stage 150 has four multiplexers 156(1)-156(4) configured to registers 152 and 154 as follows:

Multiplexer 156(1) receives the four 16-bit words A-D from register 154;

Multiplexer 156(2) receives the three 16-bit words B-D from register 154 and the one 16-bit word E from register 152;

Multiplexer 156(3) receives the two 16-bit words C and D from register 154 and the two 16-bit words E and F from register 152; and Multiplexer 156(4) receives the one 16-bit word D from register 154 and the three 16-bit words E-G from register 152.

Each multiplexer 156 outputs all 64 of its received bits to a different 64-bit input of (4×1) multiplexer 158, which outputs one of its received 64-bit double-words as 64-bit double-word 159 based on the value (0-3) of a multiplexer (mux) select signal 161 received from SOP/SOC detection and rule implementation processor 160. As described further below, multiplexer 166 receives 64-bit double-word 159 and (possibly) overwrite data 163 from data overwrite generator 162 and (selectively) overwrites specific 16-bit words in 64-bit double-word 159 with overwrite data 163 as dictated by overwrite control signal 165 received from processor 160.

The selection performed by mux 158 and the data overwriting (selectively) implemented by mux 166 are based on Table I of FIG. C, which is implemented by processor 160 and generator 162. (Although not explicitly shown in FIG. 1, processor 160 and generator 162 communicate with one another.)

In general, processor 160 analyzes the two 64-bit doublewords currently stored in registers 152 and 154 to detect and determine when the upstream CTC processing has inserted or removed a 16-bit Idle word into or from the data stream. In particular, processor 160 keeps track of the location (i.e., byte A, B, C, or D) of the previously detected set of SOP/SOC data in register 154 and detects and identifies when the next set of SOP/SOC data has a different location in either register 152 or 154 (i.e., byte A, B, C, D, E, F, or G), depending on the previous value of mux select signal 161. Note that, since CTC processing is limited to inserting or removing a single 16-bit word at a time, if the previous location of SOP/SOC data was, for example, at word B, then the next occurrence of CTC insertion or removal would result in the subsequent location of SOP/SOC data being at either word C or word A, respectively. Note that, if the previous SOP/SOC location was at word A, then the next occurrence of CTC insertion or removal would result in the subsequent SOP/SOC location being at either byte B or byte D, respectively.

Table I of FIG. 2 represents all of the possible scenarios for changes in the locations of SOP/SOC data resulting from CTC events from each possible previous location to each possible new location.

Scenario 1

In Scenario 1, mux select signal 161 has had a previous value of 0, the previous SOP/SOC position was detected at either word A or word C, and the new SOP/SOC position is detected at word B. The previous value of 0 for mux select signal 161 means that words A-D were previously being output from mux 158 during each processing cycle.

A change in the SOP/SOC position from word A in register 154 during a previous processing cycle to word B in register 154 during the current processing cycle corresponds to a CTC insertion of a 16-bit Idle word into the set of one or more 32-bit SRIO Idle words immediately preceding the newly detected SOP/SOC data. In this case, word A will be a 16-bit Idle word. If no adjustment were made, then the CTC insertion would result in a misalignment of data within 64-bit output data stream 175.

On the other hand, a change in the SOP/SOC position from word C in register 154 during a previous processing cycle to word B in register 154 during the current processing cycle corresponds to a CTC removal of a 16-bit Idle word from the set of one or more 32-bit SRIO Idle words immediately preceding the newly detected SOP/SOC data. In this case, too, word A will be a 16-bit Idle word. Here, too, if no adjustment were made, then the CTC removal would result in a misalignment of data within 64-bit output data stream 175.

In either case, in order to align the newly detected SOP/SOC data on a 32-bit boundary within 64-bit output data stream 175, processor 160 immediately changes the value of mux select signal 161 from 0 to 1, which causes mux 158 to output words B-E. Mux 166 does not perform any data overwrite operations, and 16-bit words B-E pass through mux 166 as the next 64-bit double-word in output data stream 175. Note that 16-bit Idle word A gets dropped from the data stream during the current processing cycle. Note further that the currently detected SOP/SOC data at word B will be properly aligned with the first (i.e., left) 32-bit word in 64-bit output data stream 175. In subsequent processing cycles, absent any further CTC events, the next set of SOP/SOC data will appear at either 16-bit word B or D.

This mux configuration is maintained until the next change in SOP/SOC data location is detected by processor 160. As such, until that change is detected, bytes B-E will be output during each subsequent processing cycle of continuous alignment stage 150. There may be multiple sets of SOP/SOC data that occur in the data stream before the next CTC event is performed, but those multiple sets of SOP/SOC data will remain aligned within 64-bit output data stream 175. If and when the next CTC event occurs, that CTC event will correspond to either Scenario 3 or Scenario 4.

Scenario 2

In Scenario 2, mux select signal 161 has had a previous value of 0, the previous SOP/SOC position was detected at either word A or word C, and the new SOP/SOC position is detected at word D. The previous value of 0 for mux select signal 161 means that words A-D were previously being output from mux 158 during each processing cycle.

A change in the SOP/SOC position from word C in register 154 during a previous processing cycle to word D in register 154 during the current processing cycle corresponds to a CTC insertion of a 16-bit Idle word into the set of one or more 32-bit SRIO Idle words immediately preceding the newly detected SOP/SOC data. In this case, word C will be a 16-bit Idle word. If no adjustment were made, then the CTC insertion would result in a misalignment of data within 64-bit output data stream 175.

On the other hand, a change in the SOP/SOC position from word A in register 154 during a previous processing cycle to word D in register 154 during the current processing cycle corresponds to a CTC removal of a 16-bit Idle word from the set of one or more 32-bit SRIO Idle words immediately preceding the newly detected SOP/SOC data. In this case, too, word C will be a 16-bit Idle word. Here, too, if no adjustment were made, then the CTC removal would result in a misalignment of data within 64-bit output data stream 175.

In either case, in order to align the newly detected SOP/SOC data on a 32-bit boundary within 64-bit output data stream 175, processor 160 and data overwrite generator 162 control muxes 158 and 166 to output 16-bit data words A, B, D, and E as the next 64-bit double-word in 64-bit output data stream 175. This can be achieved by keeping mux select signal 161 at 0 and using overwrite data 163 to overwrite 16-bit words C and D in 64-bit double-word 159 with 16-bit words D and E, respectively. For subsequent processing cycles (until the next change in SOP/SOC position is detected), data overwrite generator 162 is disabled, and processor 160 sets the value of mux select signal 161 to 1, such that 16-bit words B-E are output at each 64-bit double-word in output data stream 175.

This mux configuration is maintained until the next change in SOP/SOC data location is detected by processor 160. As such, until that change is detected, bytes B-E will be output during each subsequent processing cycle of continuous alignment stage 150. There may be multiple sets of SOP/SOC data that occur in the data stream before the next CTC event occurs, but those multiple sets of SOP/SOC data will remain aligned within 64-bit output data stream 175. If and when the next CTC event occurs, that CTC event will correspond to either Scenario 3 or Scenario 4.

Scenario 3

In Scenario 3, mux select signal 161 has had a previous value of 1, the previous SOP/SOC position was detected at either word B or word D, and the new SOP/SOC position is detected at word C. The previous value of 1 for mux select signal 161 means that words B-E were previously being output from mux 158 during each processing cycle.

A change in the SOP/SOC position from word B in register 154 during a previous processing cycle to word C in register 154 during the current processing cycle corresponds to a CTC insertion of a 16-bit Idle word into the set of one or more 32-bit SRIO Idle words immediately preceding the newly detected SOP/SOC data. In this case, word B will be a 16-bit Idle word. If no adjustment were made, then the CTC insertion would result in a misalignment of data within 64-bit output data stream 175.

On the other hand, a change in the SOP/SOC position from word D in register 154 during a previous processing cycle to word C in register 154 during the current processing cycle corresponds to a CTC removal of a 16-bit Idle word from the set of one or more 32-bit SRIO Idle words immediately preceding the newly detected SOP/SOC data. In this case, too, word B will be a 16-bit Idle word. Here, too, if no adjustment were made, then the CTC removal would result in a misalignment of data within 64-bit output data stream 175.

In either case, in order to align the newly detected SOP/SOC data on a 32-bit boundary within 64-bit output data stream 175, processor 160 immediately changes the value of mux select signal 161 from 1 to 2, which causes mux 158 to output words C-F. Mux 166 does not perform any data overwrite operations, and 16-bit words C-F pass through mux 166 as the next 64-bit double-word in output data stream 175. Note that 16-bit Idle word B gets dropped from the data stream during the current processing cycle. Note further that the currently detected SOP/SOC data at word C will be properly aligned with the first (i.e., left) 32-bit word in 64-bit output data stream 175. In subsequent processing cycles, absent any further CTC events, the next set of SOP/SOC data will appear at either 16-bit word C or A.

This mux configuration is maintained until the next change in SOP/SOC data location is detected by processor 160. As such, until that change is detected, bytes C-F will be output during each subsequent processing cycle of continuous alignment stage 150. There may be multiple sets of SOP/SOC data that occur in the data stream before the next CTC event is performed, but those multiple sets of SOP/SOC data will remain aligned within 64-bit output data stream 175. If and when the next CTC event occurs, that CTC event will correspond to either Scenario 5 or Scenario 6.

Scenario 4

In Scenario 4, mux select signal 161 has had a previous value of 1, the previous SOP/SOC position was detected at either word B or word D, and the new SOP/SOC position is detected at word E, which corresponds to word A in the subsequent processing cycle. The previous value of 1 for mux select signal 161 means that words B-E were previously being output from mux 158 during each processing cycle.

A change in the SOP/SOC position from word D in register 154 during a previous processing cycle to word E in register 152 during the current processing cycle corresponds to a CTC insertion of a 16-bit Idle word into the set of one or more 32-bit SRIO Idle words immediately preceding the newly detected SOP/SOC data. In this case, word D will be a 16-bit Idle word. If no adjustment were made, then the CTC insertion would result in a misalignment of data within 64-bit output data stream 175.

On the other hand, a change in the SOP/SOC position from word B in register 154 during a previous processing cycle to word E in register 152 during the current processing cycle corresponds to a CTC removal of a 16-bit Idle word from the set of one or more 32-bit SRIO Idle words immediately preceding the newly detected SOP/SOC data. In this case, too, word D will be a 16-bit Idle word. Here, too, if no adjustment were made, then the CTC removal would result in a misalignment of data within 64-bit output data stream 175.

In either case, in order to align the newly detected SOP/SOC data on a 32-bit boundary within 64-bit output data stream 175 and to avoid outputting the data in word E twice (i.e., once during the current processing cycle and then again during the very next processing cycle when that same data will be located at word A in register 154), processor 160 and data overwrite generator 162 control muxes 158 and 166 to overwrite word E with a 16-bit Idle word and output 16-bit data words B, C, and D followed by the 16-bit Idle word as the next 64-bit double-word in 64-bit output data stream 175. This can be achieved by keeping mux select signal 161 at 1 and using overwrite data 163 to overwrite 16-bit word E in 64-bit double-word 159 with a 16-bit Idle word. For subsequent processing cycles (until the next change in SOP/SOC position is detected), data overwrite generator 162 is disabled, and processor 160 sets the value of mux select signal 161 to 0, such that 16-bit words A-D are output at each 64-bit double-word in output data stream 175.

This mux configuration is maintained until the next change in SOP/SOC data location is detected by processor 160. As such, until that change is detected, bytes A-D will be output during each subsequent processing cycle of continuous alignment stage 150. There may be multiple sets of SOP/SOC data that occur in the data stream before the next CTC event occurs, but those multiple sets of SOP/SOC data will remain aligned within 64-bit output data stream 175. If and when the next CTC event occurs, that CTC event will correspond to either Scenario 1 or Scenario 2.

Scenario 5

In Scenario 5, mux select signal 161 has had a previous value of 2, the previous SOP/SOC position was detected at either word C or word A, and the new SOP/SOC position is detected at word D. The previous value of 2 for mux select signal 161 means that words C-F were previously being output from mux 158 during each processing cycle.

A change in the SOP/SOC position from word C in register 154 during a previous processing cycle to word D in register 154 during the current processing cycle corresponds to a CTC insertion of a 16-bit Idle word into the set of one or more 32-bit SRIO Idle words immediately preceding the newly detected SOP/SOC data. In this case, word C will be a 16-bit Idle word. If no adjustment were made, then the CTC insertion would result in a misalignment of data within 64-bit output data stream 175.

On the other hand, a change in the SOP/SOC position from word A in register 154 during a previous processing cycle to word D in register 154 during the current processing cycle corresponds to a CTC removal of a 16-bit Idle word from the set of one or more 32-bit SRIO Idle words immediately preceding the newly detected SOP/SOC data. In this case, too, word C will be a 16-bit Idle word. Here, too, if no adjustment were made, then the CTC removal would result in a misalignment of data within 64-bit output data stream 175.

In either case, in order to align the newly detected SOP/SOC data on a 32-bit boundary within 64-bit output data stream 175, processor 160 immediately changes the value of mux select signal 161 from 2 to 3, which causes mux 158 to output words D-G. Mux 166 does not perform any data overwrite operations, and 16-bit words B-E pass through mux 166 as the next 64-bit double-word in output data stream 175. Note that 16-bit Idle word C gets dropped from the data stream during the current processing cycle. Note further that the currently detected SOP/SOC data at word D will be properly aligned with the first (i.e., left) 32-bit word in 64-bit output data stream 175. In subsequent processing cycles, absent any further CTC events, the next set of SOP/SOC data will appear at either 16-bit word D or B.

This mux configuration is maintained until the next change in SOP/SOC data location is detected by processor 160. As such, until that change is detected, bytes D-G will be output during each subsequent processing cycle of continuous alignment stage 150. There may be multiple sets of SOP/SOC data that occur in the data stream before the next CTC event is performed, but those multiple sets of SOP/SOC data will remain aligned within 64-bit output data stream 175. If and when the next CTC event occurs, that CTC event will correspond to either Scenario 7 or Scenario 8.

Scenario 6

In Scenario 6, mux select signal 161 has had a previous value of 2, the previous SOP/SOC position was detected at either word C or word A, and the new SOP/SOC position is detected at word F, which corresponds to word B in the subsequent processing cycle. The previous value of 2 for mux select signal 161 means that words C-F were previously being output from mux 158 during each processing cycle.

A change in the SOP/SOC position from word A in register 154 during a previous processing cycle to word F in register 152 during the current processing cycle corresponds to a CTC insertion of a 16-bit Idle word into the set of one or more 32-bit SRIO Idle words immediately preceding the newly detected SOP/SOC data. In this case, word E will be a 16-bit Idle word. If no adjustment were made, then the CTC insertion would result in a misalignment of data within 64-bit output data stream 175.

On the other hand, a change in the SOP/SOC position from word C in register 154 during a previous processing cycle to word F in register 152 during the current processing cycle corresponds to a CTC removal of a 16-bit Idle word from the set of one or more 32-bit SRIO Idle words immediately preceding the newly detected SOP/SOC data. In this case, too, word E will be a 16-bit Idle word. Here, too, if no adjustment were made, then the CTC removal would result in a misalignment of data within 64-bit output data stream 175.

In either case, in order to align the newly detected SOP/SOC data on a 32-bit boundary within 64-bit output data stream 175 and to avoid outputting the data in word F twice (i.e., once during the current processing cycle and then again during the very next processing cycle when that same data will be located at word B in register 154), processor 160 and data overwrite generator 162 control muxes 158 and 166 to overwrite word F with a 16-bit Idle word and output 16-bit data words C, D, and E followed by the 16-bit Idle word as the next 64-bit double-word in 64-bit output data stream 175. This can be achieved by keeping mux select signal 161 at 2 and using overwrite data 163 to overwrite 16-bit word F in 64-bit double-word 159 with a 16-bit Idle word. For subsequent processing cycles (until the next change in SOP/SOC position is detected), data overwrite generator 162 is disabled, and processor 160 sets the value of mux select signal 161 to 1, such that 16-bit words B-E are output at each 64-bit double-word in output data stream 175.

This mux configuration is maintained until the next change in SOP/SOC data location is detected by processor 160. As such, until that change is detected, bytes B-E will be output during each subsequent processing cycle of continuous alignment stage 150. There may be multiple sets of SOP/SOC data that occur in the data stream before the next CTC event occurs, but those multiple sets of SOP/SOC data will remain aligned within 64-bit output data stream 175. If and when the next CTC event occurs, that CTC event will correspond to either Scenario 3 or Scenario 4.

Scenario 7

In Scenario 7, mux select signal 161 has had a previous value of 3, the previous SOP/SOC position was detected at either word D or word B, and the new SOP/SOC position is detected at word E, which corresponds to word A in the subsequent processing cycle. The previous value of 3 for mux select signal 161 means that words D-G were previously being output from mux 158 during each processing cycle.

A change in the SOP/SOC position from word D in register 154 during a previous processing cycle to word E in register 152 during the current processing cycle corresponds to a CTC insertion of a 16-bit Idle word into the set of one or more 32-bit SRIO Idle words immediately preceding the newly detected SOP/SOC data. In this case, word D will be a 16-bit Idle word. If no adjustment were made, then the CTC insertion would result in a misalignment of data within 64-bit output data stream 175.

On the other hand, a change in the SOP/SOC position from word B in register 154 during a previous processing cycle to word E in register 152 during the current processing cycle corresponds to a CTC removal of a 16-bit Idle word from the set of one or more 32-bit SRIO Idle words immediately preceding the newly detected SOP/SOC data. In this case, too, word D will be a 16-bit Idle word. Here, too, if no adjustment were made, then the CTC removal would result in a misalignment of data within 64-bit output data stream 175.

In either case, in order to align the newly detected SOP/SOC data on a 32-bit boundary within 64-bit output data stream 175 and to avoid outputting the data in word C twice (i.e., once during the previous processing cycle when that same data was at word G in register 152 and then again during the current processing cycle), processor 160 and data overwrite generator 162 control muxes 158 and 166 to overwrite word C with a 16-bit Idle word and output that 16-bit Idle word followed by 16-bit data words D, E, and F as the next 64-bit double-word in 64-bit output data stream 175. This can be achieved by changing mux select signal 161 to 2 and using overwrite data 163 to overwrite 16-bit word C in 64-bit double-word 159 with a 16-bit Idle word. For subsequent processing cycles (until the next change in SOP/SOC position is detected), data overwrite generator 162 is disabled, and processor 160 keeps the value of mux select signal 161 at 2, such that 16-bit words C-F are output at each 64-bit double-word in output data stream 175.

This mux configuration is maintained until the next change in SOP/SOC data location is detected by processor 160. As such, until that change is detected, bytes C-F will be output during each subsequent processing cycle of continuous alignment stage 150. There may be multiple sets of SOP/SOC data that occur in the data stream before the next CTC event occurs, but those multiple sets of SOP/SOC data will remain aligned within 64-bit output data stream 175. If and when the next CTC event occurs, that CTC event will correspond to either Scenario 5 or Scenario 6.

Scenario 8

In Scenario 8, mux select signal 161 has had a previous value of 3, the previous SOP/SOC position was detected at either word D or word B, and the new SOP/SOC position is detected at word G, which corresponds to word C in the subsequent processing cycle. The previous value of 3 for mux select signal 161 means that words D-G were previously being output from mux 158 during each processing cycle.

A change in the SOP/SOC position from word B in register 154 during a previous processing cycle to word G in register 152 during the current processing cycle corresponds to a CTC insertion of a 16-bit Idle word into the set of one or more 32-bit SRIO Idle words immediately preceding the newly detected SOP/SOC data. In this case, word F will be a 16-bit Idle word. If no adjustment were made, then the CTC insertion would result in a misalignment of data within 64-bit output data stream 175.

On the other hand, a change in the SOP/SOC position from word D in register 154 during a previous processing cycle to word G in register 152 during the current processing cycle corresponds to a CTC removal of a 16-bit Idle word from the set of one or more 32-bit SRIO Idle words immediately preceding the newly detected SOP/SOC data. In this case, too, word F will be a 16-bit Idle word. Here, too, if no adjustment were made, then the CTC removal would result in a misalignment of data within 64-bit output data stream 175.

In either case, in order to align the newly detected SOP/SOC data on a 32-bit boundary within 64-bit output data stream 175 and to avoid outputting the data in word G twice (i.e., once during the current processing cycle and then again during the very next processing cycle when that same data will be located at word C in register 154), processor 160 and data overwrite generator 162 control muxes 158 and 166 to overwrite word G with a 16-bit Idle word and output 16-bit data words D, E, and F followed by the 16-bit Idle word as the next 64-bit double-word in 64-bit output data stream 175. This can be achieved by keeping mux select signal 161 at 3 and using overwrite data 163 to overwrite 16-bit word G in 64-bit double-word 159 with a 16-bit Idle word. For subsequent processing cycles (until the next change in SOP/SOC position is detected), data overwrite generator 162 is disabled, and processor 160 sets the value of mux select signal 161 to 2, such that 16-bit words C-F are output at each 64-bit double-word in output data stream 175.

This mux configuration is maintained until the next change in SOP/SOC data location is detected by processor 160. As such, until that change is detected, bytes C-F will be output during each subsequent processing cycle of continuous alignment stage 150. There may be multiple sets of SOP/SOC data that occur in the data stream before the next CTC event occurs, but those multiple sets of SOP/SOC data will remain aligned within 64-bit output data stream 175. If and when the next CTC event occurs, that CTC event will correspond to either Scenario 5 or Scenario 6.

Alternative Embodiments

Although the present invention has been described in the context of data streams having 32-bit serial input words and 64-bit parallel output double-words, where CTC processing inserts 16-bit Idle words, the present invention is not necessarily limited to that particular context. The present invention can be implemented in other contexts as well, such as those having serial input words having more or fewer than 32 bits and/or parallel output words having more or fewer than 64 bits and/or CTC processing that inserts Idle words having more or fewer than 16 bits. Depending on the particular numbers of bits involved, such contexts may need to be implemented using different numbers of registers and muxes and/or registers and muxes of different sizes than those in FIG. 1. In addition, the present invention can be implemented to align misaligned data resulting from upstream processing other than CTC processing.

The present invention can be implemented in the context of any suitable type of integrated circuit device, such as, without limitation, application-specific integrated circuits (ASICs), field-programmable gate arrays (FPGAs), programmable logic devices (PLDs), mask-programmable gate arrays (MPGAs), simple programmable logic devices (SPLDs), and complex programmable logic devices (CPLDs).

The present invention may be implemented as (analog, digital, or a hybrid of both analog and digital) circuit-based processes, including possible implementation as a single integrated circuit (such as an 152IC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A receiver (e.g., 100) comprising:
   serial-to-parallel (S-to-P) conversion circuitry (e.g., 110, 130) configured to convert a serial input data stream (e.g., 105) having M-bit serial-data words into an N-bit parallel data stream (e.g., 137), wherein M and N are positive integers; and
   continuous alignment circuitry (e.g., 150) configured to correct for misalignment of the M-bit serial-data words within the N-bit parallel data stream to generate an N-bit aligned parallel output data stream (e.g., 175), wherein the continuous alignment circuitry is based on a mapping (e.g., Table I) from each of a finite number of possible previous alignment conditions (e.g., A, B, C, D) to a corresponding finite number of possible subsequent alignment conditions (e.g., B, C, D, E, F, G).

2. The invention of claim 1, wherein the receiver further comprises initialization alignment circuitry (e.g., 140) configured to establish an initial alignment condition for the N-bit parallel data stream that dictates each of the finite number of possible previous alignment conditions and the corresponding finite number of possible subsequent alignment conditions.

3. The invention of claim 2, wherein the initialization alignment circuitry comprises:
   a barrel shifter (e.g., 144) configured to selectively adjust misalignment of the N-bit parallel data stream (e.g., 137) based on a specified shift value (e.g., 0-7 bytes) to generate a selectively adjusted N-bit parallel data stream (e.g., 145); and
   a detector (e.g., 142) configured to detect the misalignment in the N-bit parallel data stream (e.g., 137) and generate the specified shift value for the barrel shifter.

4. The invention of claim 2, wherein:
   M=32 and N=64;
   the 64-bit parallel data stream comprises two 32-bit parallel-data words;
   the initial alignment condition established by the initialization alignment circuitry corresponds to the 32-bit serial-data words aligned with the two 32-bit parallel-data words in the 64-bit parallel data stream; and
   according to the mapping, each possible previous alignment condition maps to two possible subsequent alignment conditions that are 16 bits away from the possible previous alignment condition.

5. The invention of claim 1, wherein the misalignment results from clock tolerance compensation (CTC) processing (e.g., 114) upstream of the continuous alignment circuitry.

6. The invention of claim 5, wherein the CTC processing selectively inserts or removes a P-bit Idle word into and from the N-bit parallel data stream, wherein P is different from M.

7. The invention of claim 1, wherein the continuous alignment circuitry comprises:
   a plurality of registers (e.g., 152, 154) configured to store a plurality of consecutive N-bit parallel data words;
   a plurality of overlapping multiplexers (e.g., 156(1)-(4)), each configured to generate a different, overlapping, N-bit parallel data word from the consecutive N-bit parallel data words stored in the plurality of registers;
   a selection multiplexer (e.g., 158) configured to receive the plurality of overlapping, N-bit parallel data words from the plurality of overlapping multiplexers and selectively output one of the overlapping, N-bit parallel data words; and
   a processor (e.g., 160) configured to generate a mux select signal (e.g., 161) to control the selection by the selection multiplexer based on a previous value for the mux select signal.

8. The invention of claim 7, wherein the processor (i) detects a change in position of start-of-packet (SOP) or start-of-control-symbol (SOC) data in the plurality of consecutive N-bit parallel data words stored in the plurality of registers and (ii) generates the mux select signal further based on the detected change in position.

9. The invention of claim 7, wherein the continuous alignment circuitry further comprises an output multiplexer (e.g., 166) configured to receive the selected, overlapping, N-bit parallel data word (e.g., 159) from the selection multiplexer and selectively overwrite a portion of the bits in the selected, overlapping, N-bit parallel data word to generate an N-bit word for the N-bit aligned parallel output data stream.

10. The invention of claim 7, wherein:
    M=32 and N=64;
    the 64-bit parallel data stream comprises two 32-bit parallel-data words;
    according to the mapping, each possible previous alignment condition maps to two possible subsequent alignment conditions that are 16 bits away from the possible previous alignment condition;
    the plurality of registers are two 64-bit registers (e.g., 152, 154) configured to store two consecutive 64-bit parallel data words;
    the plurality of overlapping multiplexers are four overlapping multiplexers (e.g., 156(1)-(4)), each configured to generate a different, overlapping, 64-bit parallel data word from two registers; and
    the selection multiplexer (e.g., 158) is configured to receive the four overlapping, N-bit parallel data words from the four overlapping multiplexers and selectively output one of the overlapping, N-bit parallel data words.

11. The invention of claim 1, wherein the S-to-P conversion circuitry and the continuous alignment circuitry are implemented on a field-programmable gate array (FPGA).

12. A method comprising:
    (a) converting (e.g., 110, 130) a serial input data stream (e.g., 105) having M-bit serial-data words into an N-bit parallel data stream (e.g., 137), wherein M and N are positive integers; and
    (b) correcting (e.g., 150) for misalignment of the M-bit serial-data words within the N-bit parallel data stream to generate an N-bit aligned parallel output data stream (e.g., 175), wherein the correcting is based on a mapping (e.g., Table I) from each of a finite number of possible previous alignment conditions (e.g., A, B, C, D) to a corresponding finite number of possible subsequent alignment conditions (e.g., B, C, D, E, F, G).

* * * * *